United States Patent Office 3,785,943
Patented Jan. 15, 1974

3,785,943
ELECTROLYSIS OF MAGNESIUM CHLORIDE
Herbert Eberle, Hannover, Wolfgang Meyer, Benthe, and Johann Haase, Empelde, Germany, assignors to Salzdetfurth AG
No Drawing. Filed Nov. 23, 1971, Ser. No. 201,387
Claims priority, application Germany, Dec. 7, 1970, P 20 60 066.2
Int. Cl. C01b 7/06; C01f 5/18
U.S. Cl. 204—100
11 Claims

ABSTRACT OF THE DISCLOSURE

A process for the electrolysis of magnesium chloride solutions, in the presence of an alkali metal chloride to yield chlorine and magnesium hydroxide.

In the processing of potassium salts large quantities of final liquors are obtained, which chiefly contain magnesium chloride and which have hitherto been utilized only to a limited extent in industry. Basically both the magnesium which can be obtained and the chlorine content of these magnesium chloride solutions are of interest from the technical and economic point of view. What is particularly important is the extraction of chlorine from such solutions. No alkaline liquors such as sodium hydroxide are obtained in the process as they are in alkali chloride electrolysis, which has so far been the most important method of extracting chlorine. In the process of the present invention magnesium hydroxide is precipitated as the cathodic product instead of sodium hydroxide.

However, electrolysis of an aqueous magnesium chloride solution is technically far more difficult than alkali chloride electrolysis because of the formation of a solid reaction product, magnesium hydroxide. The magnesium hydroxide may settle in the cathode space and clog it, thereby gradually so increasing the resistance of the cell as to make it inoperative.

Under certain conditions the magnesium hydroxide may also be deposited on the cathode itself and completely envelope it. Such encrustation of the cathode gives the cell a high resistance within a very short time.

To prevent the cell from becoming clogged the distance between the cathode and the diaphragm must be kept relatively large, thereby increasing the specific current consumption.

The cathode is said not to become encrusted at certain current densities. The data on the optimum current density does not agree and varies between 800 a./m.$^2$ at the upper limit and minimum values of about 1600 to 1800 a./m.$^2$.

Attempts have already been made to avoid the difficulties inherent in having solids produced in the cell by changing the procedure. Thus a method is known whereby chlorine and caustic soda solution are made as usual by alkali chloride electrolysis, after which the caustic soda solution is reacted with magnesium chloride solution to give magnesium hydroxide and sodium chloride solution, and the sodium chloride solution is then electrolyzed again. This prevents any solids from being produced in the actual electrolytic cell. However, the filtering properties of the magnesium hydroxide are so bad that additional expensive procedures then have to be carried out to improve them.

Another process makes use of a cell with three chambers. The chambers are separated from one another by anion exchange diaphragms. Alkali chloride electrolysis is carried out in the two outer cells and the OH ions formed in the cathode chamber migrate to the central chamber which contains a magnesium chloride solution. Here magnesium hydroxide is precipitated and separated, while the chlorine ions migrate from the central chamber to the anode chamber, where they are discharged at the anode together with the chlorine ions already there. In this process too the spacing between the electrodes is enlarged. For this reason and because the current passes twice through a diaphragm, the specific current consumption is higher.

An attempt was therefore made to find new methods of directly electrolysing magnesium chloride solutions so as to prevent the cathode space from being clogged with sedimenting magnesium hydroxide and the cathode from becoming encrusted.

A method has been found for preparing magnesium hydroxide and chlorine gas by electrolysis from aqueous electrolytes containing chiefly magnesium chloride and alkali chloride in solution with 5 to 150 g./l. $MgCl_2$ in the catholyte and 5 to 280 g./l. in the anolyte. A distinctive feature of the method is that the alkali chloride content of the electrolyte is between 30 g./l. and the saturation quantity and is electrolysed in a diaphragm cell preferably equipped with perforated and vibratable double cathodes, the spacing between the cathodes and the diaphragm being up to 10 mm. maximum.

The magnesium chloride solutions which have to be used for carrying out the method of the invention must be technically pure and must contain magnesium chloride in quantities of at least 5 g./l., calculated as an anhydrous salt. It may also be advantageous for magnesium sulphate to be dissolved in the electrolyte in quantities of up to 20% by weight, in relation to the amount of anhydrous magnesium chloride. It is therefore preferable to use for the electrolysis the final liquors from the production of potassium with alkali chloride added to them before electrolysis, or similar liquors already containing the alkali chloride. The main alkali chlorides used are sodium chloride, potassium chloride and mixtures thereof. The amount of alkali chloride used is between 30 g./l. and the saturation quantity. From an electrolyte of this composition magnesium hydroxide and chlorine gas are produced electrolytically at a temperature between 50 and 100° C., preferably 90° C., and at a cathodic current density of up to 2000 a./m.$^2$. The alkali chloride is not used up. It remains in the cell or is returned to the cell when the magnesium hydroxide has been separated.

With perforated cathodes in the form of vibratable double cathodes being used in accordance with the invention, the magnesium hydroxide formed in the space between the cathode and the diaphragm is discharged through the slots in the cathodes to the rear sides thereof. The space enclosed by each pair of cathodes must be large enough to prevent the cathode space from becoming clogged. This effect is achieved if the distance between the two cathodes of a pair is e.g. 10 to 30 mm. This step does not affect the distance between the cathodes and the anode, which is critical for current consumption. The distance between the cathode and the anode is kept relatively short. Thus the distance between the cathode and the diaphragm is limited to a few millimeters, preferably 3 to 10 mm., and the resistance of the cell is kept correspondingly low.

The cathodes used are perforated ones which, according to the invention, are in the form of vibratable double cathodes. Perforated cathodes are here understood as being made of wire netting, rods or split plate. In the case of split plate cathodes it is preferable to use the special form of the louvred cathode or else a split plate cathode where the slots and webs in each pair of cathodes are offset from one another. The particular details of the cathode structures form no part of the present invention since such cathodes are known in the art and are described, for example, in Th.A. Tangen, Erzmetall XIV/5 (1961), 218; and G. Born, Chem. Techn. 10/3 (1958), 139.

In accordance with the invention the cathodes are connected to a vibrating device.

The already described advantage of having a small distance between the electrodes so that the cathode space is not clogged by the sedimenting solid can be obtained only if the perforated cathodes are used in the form of double cathodes which are also connected to a vibrating device. The use of louvred cathodes for this purpose or the use of split plate cathodes with offset slots and webs brings a further gain in voltage.

However, the above described use of vibratable double split cathodes does not of itself lead to the desired results. Although the use of such cathodes perevents the cathode space from becoming clogged with sedimenting solid, $Mg(OH)_2$ is deposited on the cathode, specifically with this type of cathode. By further precipitation and growth the $Mg(OH)_2$ envelopes the whole cathode within a short time. The coatings are hard, cling fast to the cathode and increase the resistance of the cell. In contrast with the clogging of the cathode space by solid sediment, the encrustation of the cathode is generally a much faster process. Even in the course of one day the resistance of the cell will increase 2 or 3-fold.

In accordance with the invention the only way of preventing perforated cathodes from becoming encrusted is for alkali chloride to be contained in the catholyte in a concentration of at least 30 g./l. which may be increased to saturation. Nor can any increase in the resistance of the cell be observed then, so it is virtually unnecessary to increase the voltage of the cell during electrolysis.

The advantages of the method described are that, although magnesium hydroxide is formed in the cathode space, the space does not become clogged in spite of the small spacing between the electrodes, and the cathodes do not become encrusted. It is only in this way that the cell can operate for a long period at low voltage without giving any trouble. A further advantage is that electrolysis can be carried out in a cell of simple construction, electrolysis and the precipitation and separation of the magnesium hydroxide being combined into one step in the process.

The method of the invention will now be explained by the following practical examples.

EXAMPLE 1 (CONTROL)

In an electrolytic cell with a diaphragm made of synthetic cloth and a cathode area of 250 cm.$^2$ a magnesium chloride solution is electrolyzed at a temperature of 70° C. and a constant current density of 600 a./m.$^2$. The electrolytes have the following content of $MgCl_2$: catholyte 82 g./l., anolyte 289 g./l. The double cathode is a round bar cathode made of steel, 6 mm. away from the diaphragm. For the cell to receive a constant current load, the cell voltage must be raised from 3.9 to 15 volts within 20 hours. After the test the cathode space was free from sediment but the cathodes were completely enveloped in a hard crust of $Mg(OH)_2$.

EXAMPLE 2

In the same cell and under the same conditions an electrolyte with NaCl added was electrolyzed:

| Catholyte: | G./l. |
|---|---|
| $MgCl_2$ | 80 |
| NaCl | 40 |
| Anolyte: | |
| $MgCl_2$ | 280 |
| NaCl | 40 |

The test was interrupted after seven days.
During this time the voltage of the cell is virtually unaltered at 3.8 volts. The surface of the cathodes is free from encrustation and the cell is still ready for use.

EXAMPLE 3 (CONTROL)

In an electrolytic cell with a ceramic diaphragm and 1.2 m.$^2$ cathode area a magnesium chloride solution was electrolyzed at a temperature of 55° C. and a current density of about 900 a./m.$^2$. The cathode used was a vibratable, solid metal one, 10 mm. away from the diaphragm. The electrolytes contained no sodium chloride:

| Catholyte: | G./l. |
|---|---|
| $MgCl_2$ | 150 |
| $MgSO_4$ | 8 |
| Anolyte: | |
| $MgCl_2$ | 280 |
| $MgSO_4$ | 15 |

After eleven days of operation the cathode space of the cell was almost completely clogged with magnesium hydroxide sediment and the resistance of the cell had almost doubled.

EXAMPLE 4

Electrolysis is carried out under the same conditions in the same cell as in Example 3. In contrast with Example 3 a vibratable double split cathode made of steel was used, 7 mm. away from the diaphragm. The electrolytes were of the following composition:

| Catholyte: | G./l. |
|---|---|
| $MgCl_2$ | 80 |
| $MgSO_4$ | 8 |
| NaCl | 40 |
| Anolyte: | |
| $MgCl_2$ | 280 |
| $MgSO_4$ | 14 |
| NaCl | 50 |

The test was interrupted after 17 days. The surface of the cathodes was free from encrustation, the cathode space free from sediment and the cell still ready for use, its voltage not having risen during the test.

What is claimed is:

1. A process for the preparation of magnesium hydroxide and chlorine comprising electrolyzing in a diaphragm cell having a double cathode, an aqueous electrolyte comprising magnesium chloride and an alkali metal chloride; said magnesium chloride being present in the catholyte in the range of about 5 to 150 grams per liter and in the anolyte in the range of about 5 to 280 grams per liter; said alkali metal chloride being present in each electrolyte in the range of about 30 grams per liter to saturation; and the distance of the double cathode from the diaphragm, in said cell, being 3–10 millimeters.

2. A process according to claim 1 in which said cathode is a perforated cathode.

3. A process according to claim 2 in which said cathode is vibrating.

4. A process according to claim 1 in which the temperature of said electrolytes is about 50 to 100° C.

5. A process according to claim 3 in which a current of up to 2000 a./m.$^2$ is utilized in the electrolysis.

6. A process according to claim 5, in which said temperature is about 90° C.

7. A process according to claim 6, in which said perforated cathodes are louvred.

8. A process according to claim 6, in which said perforated cathodes are slotted.

9. A process according to claim 6, in which said alkali metal chloride is sodium chloride.

10. A process according to claim 6, in which said alkali metal chloride is potassium chloride.

11. A process according to claim 6, in which said alkali metal chloride is a mixture of potassium chloride and sodium chloride.

(References on following page)

References Cited

UNITED STATES PATENTS

| | | | |
|---|---|---|---|
| 3,536,598 | 10/1970 | Yanagase et al. | 204—128 |
| 3,498,903 | 3/1970 | Kamarjan | 204—283 |
| 3,408,281 | 10/1968 | Barnard et al. | 204—283 |
| 3,344,053 | 9/1967 | Neipert et al. | 204—283 |
| 2,643,222 | 6/1953 | Cox | 204—283 |
| 2,228,264 | 1/1941 | Freedley | 204—283 |
| 3,427,231 | 2/1969 | Schneider et al. | 204—273 |
| 1,965,399 | 7/1934 | Wehe | 204—273 |

FOREIGN PATENTS

| | | | |
|---|---|---|---|
| 526,663 | 6/1956 | Canada | 204—100 |
| 1,427,245 | 8/1964 | France | 204—273 |
| 284,288 | 10/1970 | U.S.S.R. | 204—273 |

JOHN H. MACK, Primary Examiner

R. L. ANDREWS, Assistant Examiner

U.S. Cl. X.R.

204—128